(12) United States Patent
Cao et al.

(10) Patent No.: US 11,450,902 B2
(45) Date of Patent: Sep. 20, 2022

(54) BATTERY PRE-PROCESSING APPARATUS AND METHOD

(71) Applicant: INSTITUTE OF PROCESS ENGINEERING, CHINESE ACADEMY OF SCIENCES, Beijing (CN)

(72) Inventors: Hongbin Cao, Haidian District (CN); Fei Kang, Haidian District (CN); Zhi Sun, Haidian District (CN); Xionghui Lu, Haidian District (CN)

(73) Assignee: INSTITUTE OF PROCESS ENGINEERING, CHINESE ACADEMY OF SCIENCES, Beijing (CN)

( * ) Notice: Subject to any disclaimer, the term of this patent is extended or adjusted under 35 U.S.C. 154(b) by 404 days.

(21) Appl. No.: 16/760,831

(22) PCT Filed: Dec. 10, 2018

(86) PCT No.: PCT/CN2018/119992
§ 371 (c)(1),
(2) Date: Apr. 30, 2020

(87) PCT Pub. No.: WO2019/114638
PCT Pub. Date: Jun. 20, 2019

(65) Prior Publication Data
US 2021/0167434 A1    Jun. 3, 2021

(30) Foreign Application Priority Data
Dec. 11, 2017  (CN) .......................... 201711307974.4

(51) Int. Cl.
*H01M 10/54*    (2006.01)
*C22B 7/00*    (2006.01)

(52) U.S. Cl.
CPC ............. *H01M 10/54* (2013.01); *C22B 7/001* (2013.01); *C22B 7/005* (2013.01)

(58) Field of Classification Search
CPC ........ Y02P 10/20; Y02W 30/84; C02B 7/005; H01M 10/54
(Continued)

(56) References Cited

U.S. PATENT DOCUMENTS

| 2009/0314134 A1* | 12/2009 | Iida | ........................ C22B 7/005 75/10.67 |
| 2016/0045841 A1* | 2/2016 | Kaplan | ................... C01B 32/05 429/49 |

FOREIGN PATENT DOCUMENTS

| CN | 204793105 | 11/2015 |
| CN | 106169626 | 11/2016 |

(Continued)

OTHER PUBLICATIONS

Office Action issued in related CN201711307974.4 dated May 8, 2020.

*Primary Examiner* — Terrell H Matthews
(74) *Attorney, Agent, or Firm* — Woodard, Emhardt, Henry, Reeves & Wagner, LLP

(57) ABSTRACT

Disclosed is a battery pre-processing apparatus and method. The battery pre-processing apparatus includes a control mechanism, as well as an automatic feeding mechanism, a transmission mechanism, an electricity monitoring actuator, a non-destructive testing mechanism, a flexible grabber mechanism, a multi-station operating table, an automatic cutting mechanism, an automatic separation mechanism, and a recovery and dust collection system that are each electrically connected to the control mechanism.

20 Claims, 11 Drawing Sheets

(58) Field of Classification Search
USPC .......................................................... 429/49
See application file for complete search history.

(56) References Cited

FOREIGN PATENT DOCUMENTS

| | | | | |
|---|---|---|---|---|
| CN | 106532168 | | 3/2017 | |
| CN | 106684488 | | 5/2017 | |
| CN | 106816664 | | 6/2017 | |
| CN | 106816664 A | * | 6/2017 | |
| CN | 206505993 | | 9/2017 | |
| CN | 206505993 U | * | 9/2017 | |
| CN | 106169626 B | * | 11/2018 | |
| NL | 8005718 A | * | 4/1981 | ............ B23D 19/04 |
| WO | WO-2022037140 A1 | * | 2/2022 | ............ H01M 10/54 |

* cited by examiner

BATTERY PRE-PROCESSING APPARATUS AND METHOD

CROSS REFERENCE TO RELATED APPLICATIONS

This application is a United States national stage application of co-pending International Patent Application Number PCT/CN2018/119992, filed on Dec. 10, 2018, which claims the priority of Chinese patent application number 201711307974.4 filed on Dec. 11, 2017, the disclosures of which are hereby incorporated herein by reference in their entireties.

TECHNICAL FIELD

The present disclosure relates to the field of recycling spent lithium batteries, for example, relates to a battery pre-processing method and apparatus.

BACKGROUND

In the energy battery industry, lithium-ion secondary battery technology continues to develop, and lithium-ion batteries are widely used in our production and life. Among them, the cylindrical lithium battery has advantages of high energy density, good safety, and good consistency. As a result, cylindrical lithium batteries are widely used in notebook computers, digital cameras, lighting fixtures, toy products, power tools, and new energy vehicles.

With the development of economy and society, the update rate of electronic products is getting faster and faster. Take new energy vehicles as an example. Since the promotion in 2009, with the strong support of the country, new energy vehicles have experienced explosive growth in recent years. According to statistics from the China Automobile Industry Association, China's new energy vehicle sales in 2016 reached 507,000. The service life of power batteries is generally 5 to 8 years. From 2018, China's power batteries will enter a large-scale scrapping period. Representatives are American Tesla electric Vehicles®, BYD electric Vehicles®, JAC®, YUDO®, etc., which use cylindrical lithium batteries as the basic units of the car's power supply system. New energy vehicle sales have grown significantly, resulting in a large number of spent lithium batteries.

However, China's recycling of spent lithium batteries is still in its infancy and the system is very imperfect. If during the process of recycling, landfilling, incineration, etc., heavy metal substances such as lithium hexafluorophosphate, organic solvents, cobalt, and nickel in cylindrical lithium batteries enter the environment, they will cause severe pollution to the environment and threaten human health. Spent cylindrical lithium batteries mainly rely on manual crushing and separation pretreatment. After the pretreatment, the pyrometallurgy or hydrometallurgy method is used to recover valuable metal elements such as Li, Co, Ni, and Mn found on the cathode piece. The cylindrical lithium battery is mainly composed of a cathode, an anode, an organic electrolyte, a separator, and an outer casing. The jelly roll is located inside the battery casing. Thus, to recover the valuable metals, the battery must be dismantled and pre-processed. During the manual dismantling of spent cylindrical lithium batteries, there may be problems such as corrosion of human hands by electrolyte, inhalation of harmful gases, explosion during the disassembly, low efficiency, and so on. Therefore, intelligent dismantling and pre-processing equipment is needed to reduce the secondary damage to the environment caused by disassembly, and to eliminate various hidden dangers as much as possible.

SUMMARY

The present disclosure provides a battery pre-processing apparatus, which can realize automatic feeding, battery transportation, residual power release, non-destructive testing, precise cutting, automatic separation, dust collection, and efficient automatic disassembly.

There is provided a battery pre-processing apparatus, including: a control mechanism; an automatic cutting mechanism coupled to the control mechanism and configured to cut off positive and negative terminals of a battery; an automatic feeding mechanism coupled to the control mechanism; a transmission mechanism coupled to the control mechanism; an electricity monitoring actuator arranged above the transmission mechanism and coupled to the control mechanism; a conveyor belt arranged at an end of the transmission mechanism; a non-destructive testing mechanism arranged above the transmission mechanism and coupled to the control mechanism; a flexible gripper mechanism coupled to the control mechanism; an automatic separation mechanism coupled to the control mechanism, where a discharge port is provided above the automatic separation mechanism, and the automatic separation mechanism includes a multi-station operating table; and a recovery and dust collection assembly configured to recover deformed batteries, cutting fragments, jelly rolls, and casings, as well as to extract and process exhaust gas.

There is also provided a battery pre-processing method which is implemented by using the above-mentioned battery pre-processing device, the method including:

grabbing, by the automatic feeding mechanism, batteries in batches and placing the grabbed batteries on the transmission mechanism in order for transmission;

discharging, by the electricity monitoring actuator, the batteries on the transmission mechanism;

obtaining, by the non-destructive testing mechanism, the orientations of positive and negative terminals, shape parameters, and amounts of deformation of the batteries;

transporting, by the flexible gripper mechanism, the batteries to a first station, and adjusting the orientations of the battery according to orientations of the positive and negative terminals of the batteries;

rotating, by the multi-station operating table, to allow the battery into a second station, fixing and driving, by a rotary mechanism, the battery to rotate, and controlling an automatic cutting mechanism to cut off the positive and negative terminals based on the shape parameters of the battery;

stopping rotating of the rotary mechanism, and breaking, by a casing breaking mechanism, the positive terminal of the battery;

resetting, by the rotary mechanism, and releasing the battery;

rotating, by the multi-station operating table, to bring the battery into a third station, clamping, by a fixing mechanism, the battery, and pushing, by a jelly roll pushing device, the jelly roll into a jelly roll recycling box, and meanwhile controlling the fixing mechanism to release the battery;

rotating, by the multi-station operating table, to bring the battery into a fourth station, and pushing, by a cashing push-out mechanism, the casing out for recycling; and extracting, by an exhaust gas treatment mechanism, the exhaust gas, and discharging the exhaust gas into the atmosphere after greening treatment.

| | |
|---|---|
| 1. Automatic feeding mechanism | 2. Transmission mechanism |
| 3. Electricity monitoring actuator | 4. Conveyor belt |
| 5. Automatic separation mechanism | 6. Automatic cutting mechanism |
| 7. Irregular-shaped battery recycling box | 8. Battery casing recycling box |
| 9. Jelly roll recycling box | 10. Exhaust gas treatment mechanism |
| 11. Control mechanism | 12. Loading bracket |
| 13. Loading linear assembly | 14. Loading linear slide assembly |
| 15. Loading mechanical arm | 151. Suction cup |
| 16. Sloped falling material receiving belt | 17. Baffle |
| 18. Groove conveyor belt | 19. Support frame |
| 20. Actuator guide cylinder | 21. Parallel gripper |
| 22. Discharge finger | 23. Linear slide assembly |
| 24. Detection actuator | 25. Grabber linear assembly |
| 26. Grabber guide cylinder | 27. Grabber rotation cylinder |
| 28. Grabber finger | 29. Linear cutting assembly |
| 30. Cutting motor | 31. Cutting knife |
| 32. Multi-station operating table | 33. Casing breaking mechanism |
| 34. Rotary mechanism | 35. Fixing mechanism |
| | 37. Casing push-out mechanism |
| 36. Jelly roll push-out mechanism | 39. Rotary assembly |
| 38. Rotation guide cylinder | 41. Casing breaking actuator |
| 40. Casing breaking linear assembly | 43. V-groove fixing block |
| 42. Fixing guide cylinder | 45. Jelly roll push rod |
| 44. Power guide cylinder | 51. Support plate |
| 50. Operating platform | 53. Triangular steel frame |
| 52. Scrap recycling box | |

DETAILED DESCRIPTION

Figure 1:
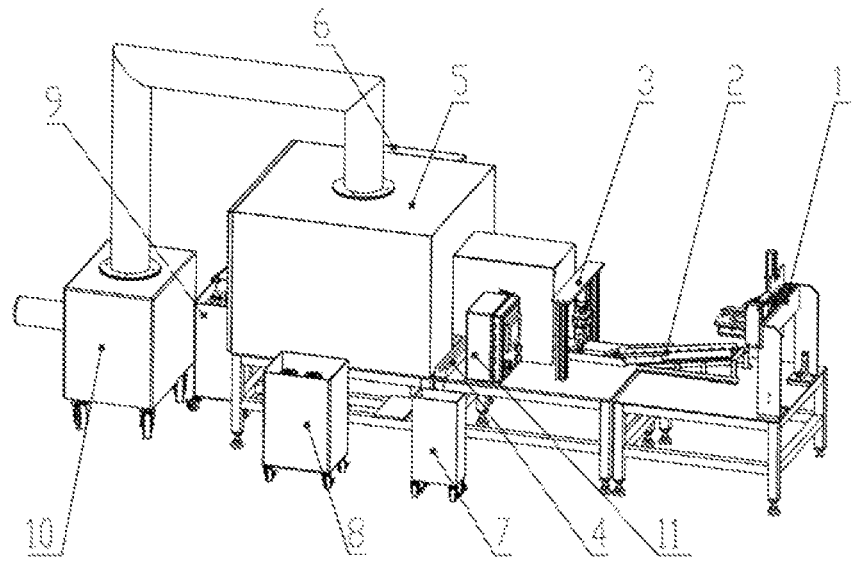
FIG. 1 is a schematic diagram illustrating a battery pre-processing apparatus provided by an embodiment.
Figure 2:
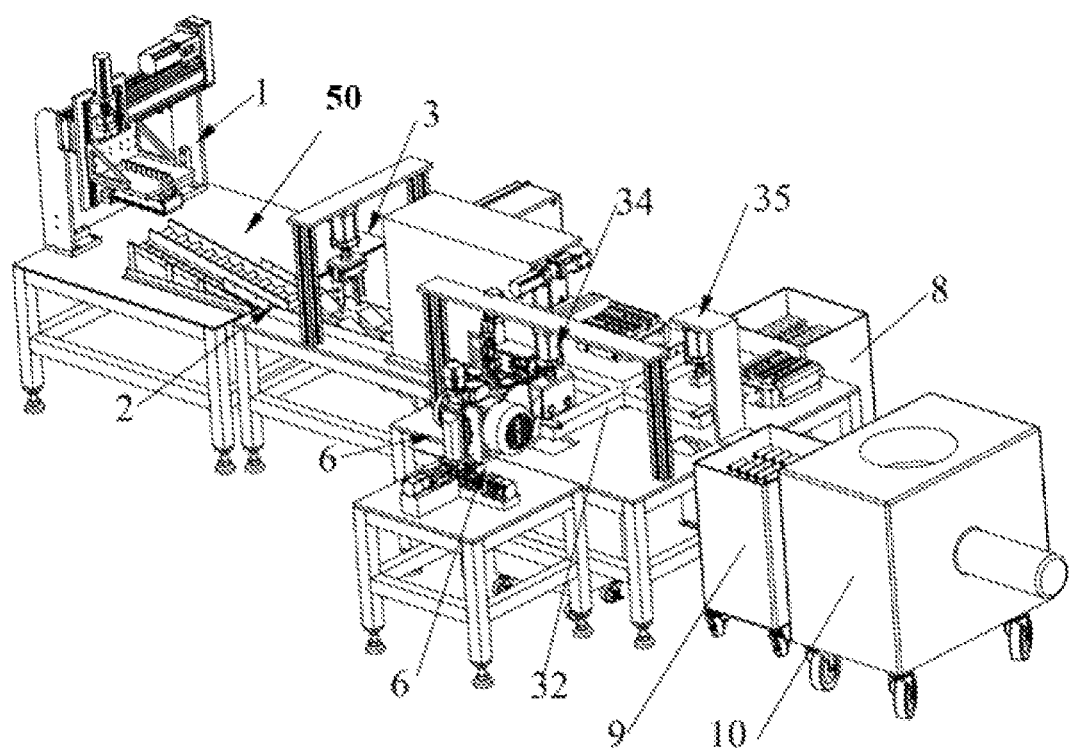
FIG. 2 is a schematic diagram illustrating the structure of a battery pre-processing apparatus provided by an embodiment viewed from another perspective.
Figure 18:
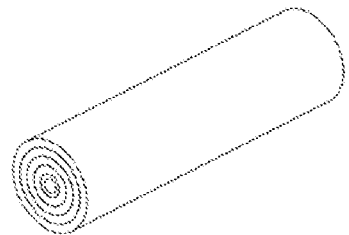
FIG. 18 is a schematic diagram illustrating the structure of a battery provided by an embodiment.

In the following specific embodiments of the present application, references are made to FIG. 1, FIG. 2 and FIG. 18. FIGS. 1 and 2 are schematic diagrams illustrating the structure of a spent battery pre-processing apparatus in accordance with an embodiment of the present application. The battery pre-processing apparatus is used to pre-process a spent cylindrical lithium battery and includes: an automatic feeding mechanism 1, a transmission mechanism 2, an electricity monitoring actuator 3, a conveyor belt 4, a non-destructive testing mechanism, a flexible grabber mechanism, an automatic cutting mechanism 6, an automatic separation mechanism 5, a recovery and dust collection assembly, and an exhaust gas treatment mechanism 10. The recovery and dust collection assembly includes four recycling boxes, which are respectively a scrap recycling box 52, a jelly roll recycling box 9, a battery casing recycling box 8, and an irregular-shaped battery recycling box 7. The automatic feeding mechanism 1, the transmission mechanism 2, the electricity monitoring actuator 3, the non-destructive testing mechanism, the flexible grabber mechanism, the automatic cutting mechanism 6, the automatic separation mechanism 5, and the exhaust gas treatment mechanism 10 are connected in sequence. The irregular-shaped battery recycling box 7 is connected to the conveyor belt 4. The scrap recycling box 52, the jelly roll recycling box 9, and the battery casing recycling box 8 are each connected to the automatic separation mechanism 5. The control mechanism 11 is coupled to each of the above-mentioned mechanisms except the recycling boxes thus realizing automatic control. The automatic separation mechanism 5 includes a multi-station operating table 32.

The automatic feeding mechanism 1 grabs the manually placed batteries in batches and places them on the transmission mechanism 2 in order to achieve unified and orderly grabbing and feeding of the batteries. The transmission mechanism 2 realizes the orderly and unified feeding of the batteries. The electricity monitoring actuator 3 realizes the discharge of the recycled batteries. The non-destructive testing mechanism is configured to detect the change in the shape of the cylindrical lithium battery, determine the orientation of the positive and negative terminals of the battery, and detect and store the battery's size parameters. The flexible grabber mechanism places the batteries on the transmission mechanism 2 on the multi-station operating table 32, where the battery cutting, and the separation of battery casing and jelly roll are both performed on the multi-station operating table 32. The automatic cutting mechanism 6 realizes precise cutting off of the battery's positive and negative terminals. The automatic separation mechanism 5 realizes the separation of the battery casing and the jelly roll. The recovery and dust collection assembly performs recycling of the battery's positive and negative terminals as well as scraps and residues, casing storage, jelly roll recycling, and greening treatment of polluting gases. According to the battery disassembly pre-processing procedures, the automatic feeding mechanism 1, the transmission mechanism 2, the flexible grabber mechanism, the automatic cutting mechanism 6, the automatic separation mechanism 5, and the recovery and dust collection assembly are sequentially arranged.

Figure 3:
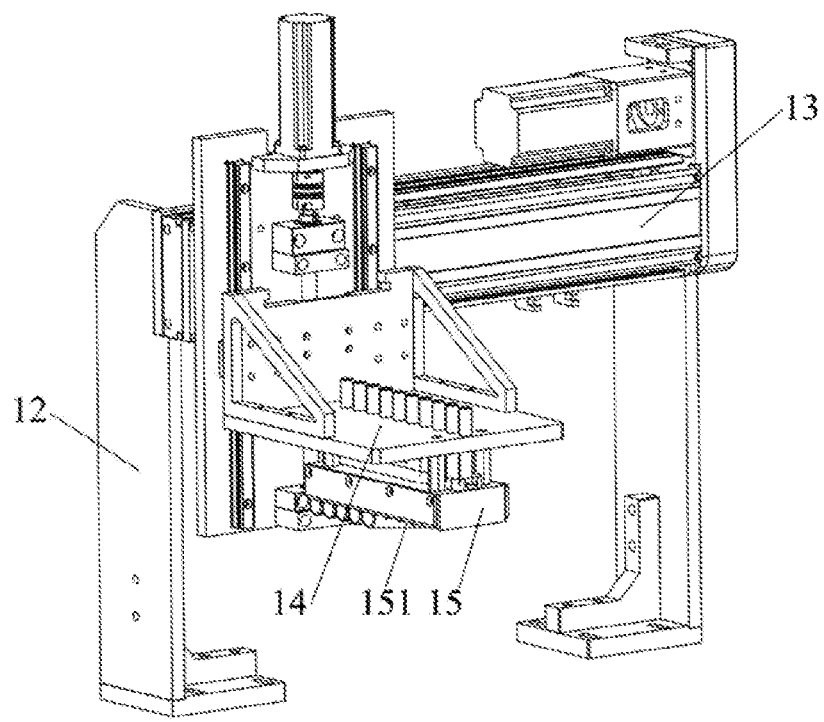
FIG. 3 is a schematic diagram illustrating an automatic feeding mechanism provided by an embodiment.

FIG. 3 illustrates the automatic feeding mechanism 1 of the battery pre-processing apparatus. The automatic feeding mechanism 1 is provided with a loading bracket 12, a loading linear assembly 13, a loading linear slide assembly 14, and a loading mechanical arm 15. The loading linear assembly 13 is arranged on the top of the loading bracket 12. The loading linear slide assembly 14 is vertically connected with the loading linear assembly 13, and is operative to slide on the loading linear assembly 13. The loading mechanical arm 15 is arranged under the loading linear slide assembly 14. The main body of the loading mechanical arm 15 is a suction cup 151 having a plurality of arc-shaped grooves, where a plurality of holes are provided in the vertical direction of the groove, and a guard plate is installed on the periphery of the suction cup 151.

The automatic feeding mechanism 1 is configured to achieve automatic feeding of the cylindrical lithium batteries. A cylindrical lithium battery box is manually placed on the operating platform 50, and then the loading linear assembly 13 and the loading linear slide assembly 14 drive the loading mechanical arm 15 to move to the desired position. The loading mechanical arm 15 grabs cylindrical lithium batteries in batches, and then transports the battery above the transmission mechanism 2. According to the production interval, the loading mechanical arm 15 sequentially releases the batteries grabbed therein to fall into the transmission mechanism 2 for battery transmission, while the automatic feeding mechanism 1 performs the next repetitive action. The loading mechanical arm 15 may use vacuum suction technology to grasp the batteries. When loading is required, the number of suction holes of the loading mechanical arm 15 may be modified according to production requirements. The vacuum suction mechanical arm may be connected to an external vacuum pipeline and to the control mechanism 11. The loading linear assembly 13 and the loading linear slide assembly 14 are electrically connected to the control mechanism 11, and can accurately realize the two degrees of freedom movement of the loading mechanical arm 15.

When the loading mechanical arm 15 uses vacuum suction technology to grasp the batteries, a vacuum suction mechanical arm may be adopted. With the above-mentioned structure, the batteries placed manually in the material box can be grabbed in batches in an orderly manner, whereby the orientation of the battery can be controlled to be in a horizontal state, and the axis along the length of the battery is perpendicular to the conveying direction of the transmission mechanism, which provides convenience for the subsequent battery transportation. When the vacuum suction mechanical arm moves to the desired position, the vacuum suction mechanical arm places the batteries on the transmission mechanism 2 one by one. The automatic feeding mechanism 1 has high efficiency, precise motion control, and can realize automatic intermittent grabbing and placement of batteries. The automatic feeding mechanism 1 is configured to precisely control the time interval on the production line, and to avoid potential safety hazards such as short circuit of the battery in a disordered state on the transmission mechanism 2, etc.

Figure 4:
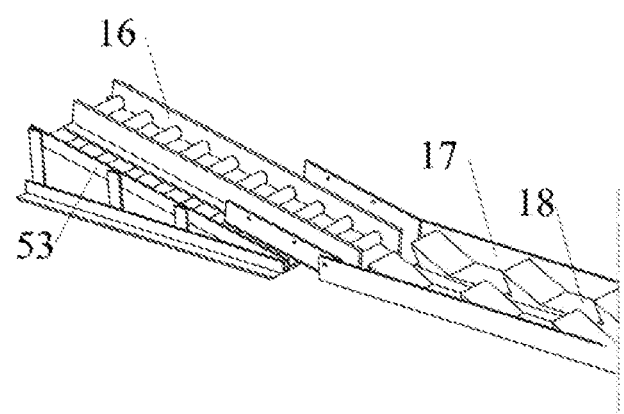
FIG. 4 is a schematic diagram illustrating a transmission mechanism provided by an embodiment.

Referring to FIG. 4, the transmission mechanism 2 of the battery pre-processing apparatus includes: a sloped falling material receiving belt 16, a baffle 17, and an L-shaped conveyor belt 18. As shown in FIG. 1, the transmission mechanism 2 is installed on the operating platform 50 and is connected to the automatic feeding mechanism 1 of the previous working procedure. In the same direction, the sloped falling material receiving belt 16 is at a first preset angle with the horizontal plane. The L-shaped conveyor belt 18 includes an inclined end and a horizontal end. The inclined end forms a second preset angle in the same direction as the horizontal plane, but the second preset angle is less than the first preset angle of the sloped falling material receiving belt 16. The sloped falling material receiving belt 16 sits on the operating platform 50 through the triangular steel frame 53, and is made of a rubber material. The baffle 17 is fixed on both sides of the L-shaped conveyor belt 18, and is configured to prevent the battery from falling out of the groove-shaped conveyor belt 18. The material of the baffle 17 is a transparent organic glass. The L-shaped conveyor belt 18 is provided with an L-shaped groove, which is configured to fix a battery. The material of the L-shaped conveyor belt 18 is rubber. The cylindrical lithium battery falls from the loading mechanical arm 15 of the previous working procedure, enters the sloped falling material receiving belt 16 under the action of gravity, and then rolls down to the L-shaped conveyor belt 18 to enter the L-shaped groove, and then the grooved conveyor belt 18 transports the battery to the next working procedure.

Using the above structural design of the transfer mechanism 2, the battery released by the automatic feeding mechanism 1 can be transferred to the next working procedure using the principle of gravity. The sloped falling material receiving belt 16 serves as a buffer zone for the materials released by the vacuum mechanical arm, which can not only catch the materials, but also transport the battery to the grooved conveyor belt 18 under the action of gravity. The grooved conveyor belt 18 is beneficial for fixing the battery that rolls down from the sloped falling material receiving belt 16 while achieving intermittent feeding. The transmission mechanism 2 as a battery conveying mechanism has a simple structure and low cost, and the feeding interval can be accurately controlled by the control mechanism 11.

Figure 5:
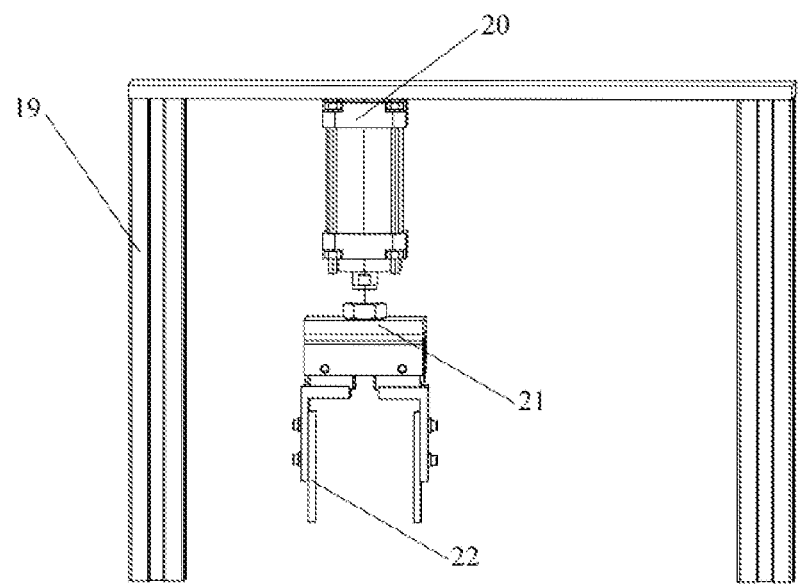
FIG. 5 is a schematic diagram illustrating an electricity monitoring actuator provided by an embodiment.

FIG. 5 shows an electricity monitoring actuator 3 of the battery pre-processing apparatus. The electricity monitoring actuator 3 includes a support frame 19, an actuator guide cylinder 20, a parallel gripper 21, and a discharge finger 22. The support frame 19 is arranged on the operating platform 50 and the actuator guide cylinder 20 is fixed to the support frame 19. The bottom of the actuator guide cylinder 20 is connected to the parallel gripper 21. The discharge finger 22 is arranged under the parallel gripper 21, and is coupled to an external battery detection device. The electricity monitoring actuator 3 is arranged above the transmission mechanism 2. The electricity monitoring actuator 3 is connected to an external battery detection device and the control mechanism 11. The electricity monitoring actuator 3 is configured to perform voltage detection and discharge of residual electricity on the cylindrical lithium battery at the location where the electricity monitoring actuator 3 is located. During the transmission interval of the cylindrical lithium batteries on the grooved conveyor belt 18, the actuator guide cylinder 20 moves to a preset position, and then the parallel gripper 21 controls the discharge finger 22 to close to complete the battery voltage detection and discharge operations. Then, the electricity monitoring actuator 3 is reset for the next operation.

The electricity monitoring actuator 3 performs the functions of voltage detection and discharge of remaining battery power. Because a spent battery that is recovered may still have remained electricity, battery voltage detection and remaining electricity discharge are required. Using the above-mentioned electricity monitoring actuator 3, the actuator guide cylinder 20 that controls the vertical movement of the discharge finger 22 realizes the vertical feed of the discharge finger 22, and the parallel gripper 21 that controls the opening and closing of the discharge finger 22 drives the discharge finger 22 to clamp the battery, and then completes the battery voltage measurement or discharge operation. The electricity monitoring actuator 3 has a stable and reliable structure, and an up to the standard technical performance.

Figure 6:
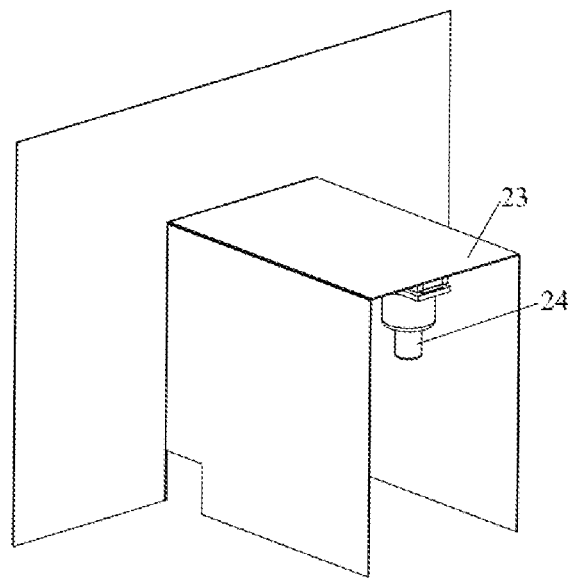
FIG. 6 is a schematic diagram illustrating a non-destructive testing mechanism provided by an embodiment.

FIG. 6 is a schematic diagram illustrating a non-destructive testing mechanism of a battery pre-processing apparatus. The non-destructive testing mechanism includes a linear slide assembly 23 and a detection actuator 24. The non-destructive testing mechanism is disposed above the grooved conveyor belt 18, and is connected to an external non-destructive testing instrument (not shown in the figure) and to the control mechanism 11. By means of the detection actuator 24 and the linear slide assembly 23, the information of the cylindrical lithium battery is obtained, such as the orientation of the battery's positive and negative terminals, size parameters, degree of deformation, and so on. The orientation of the positive and negative terminals, and the size parameters are obtained to facilitate the flexible grabber mechanism in subsequent adjustment of the orientation of the terminals. If the cylindrical lithium battery has a relatively large degree of deformation, the battery may be transported to the conveyor belt 4 and enter the irregular-shaped battery recycling box 7.

The non-destructive testing mechanism mainly performs accurate identification of positive and negative terminals, size parameter detection, and shape change identification of the battery. The non-destructive testing mechanism performing the accurate identification of the positive and negative terminals as well as the detection of battery size parameters is mainly intended to facilitate the determination of the subsequent feed amount of the automatic cutting mechanism 6. Cylindrical lithium batteries are cylindrical shaped, and improper use may cause deformation of the casing or terminal tip, affecting subsequent cutting and separation. Therefore, if a severely deformed battery is found, the conveyed belt 4 would transport the deformed battery to the outside of the battery pre-processing apparatus to enter the irregular-shaped battery recycling box 7, and the deformed battery would be separately processed by a crushing and sorting method.

Figure 7:
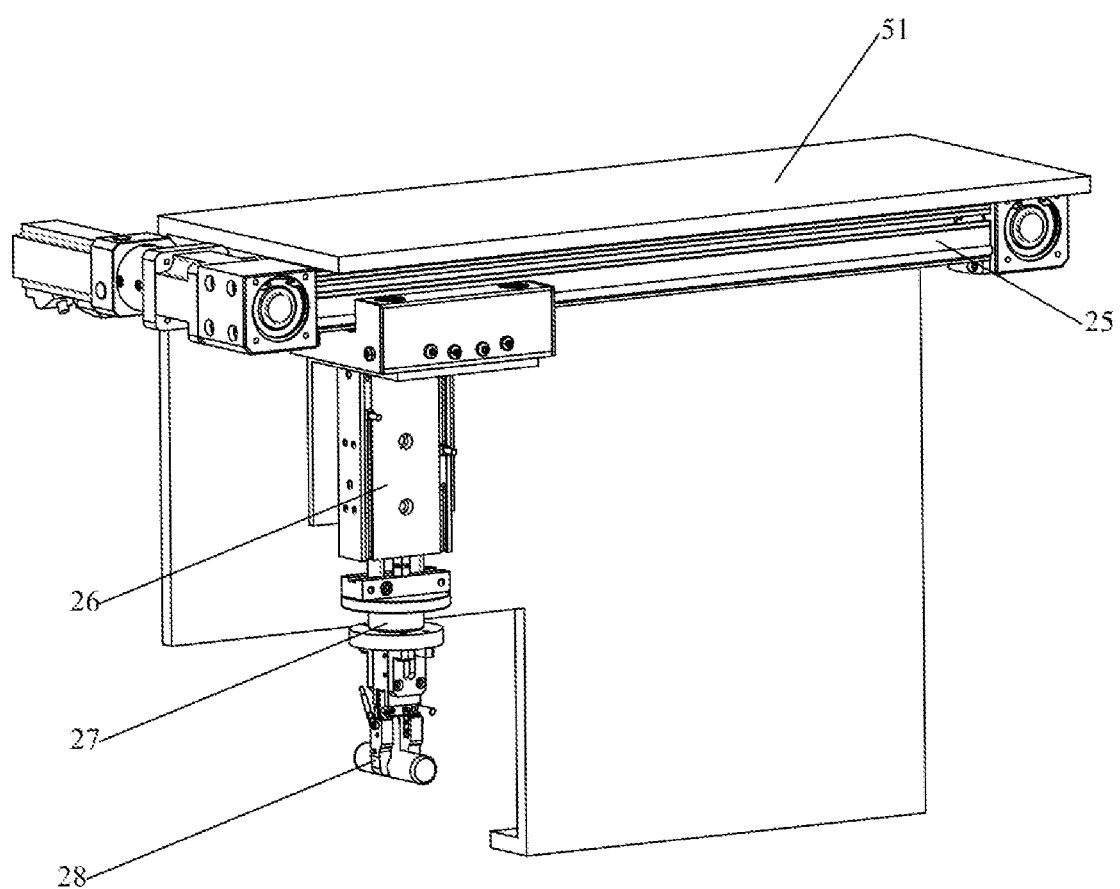
FIG. 7 is a schematic diagram illustrating a flexible grabber mechanism provided by an embodiment.

FIG. 7 shows a flexible grabber mechanism of a battery pre-processing apparatus. The flexible grabber mechanism includes a grabber linear assembly 25, a grabber guide cylinder 26, a grabber rotation cylinder 27, and a grabber finger 28. The grabber linear assembly 25 is mounted on the support plate 51. The grabber guide cylinder 26, the grabber rotation disk 27, and the grabber finger 28 are sequentially arranged under the grabber linear assembly 25. The gripper finger 28 is provided in the number of a pair, which have an arc-shaped groove.

The flexible grabber mechanism is disposed at the end of the grooved conveyor belt 18, and is externally connected to the control mechanism 11. The flexible grabber mechanism is configured to transfer the battery from the groove conveyor belt 18 to the multi-station operating table 32. The flexible grabber mechanism includes a pair of grabber fingers 28 having arc-shaped features. After the shape inspection of the cylindrical lithium battery on the grooved conveyor belt 18 is completed, the grabber linear assembly 25 and the grabber guide cylinder 26 drive the grabber fingers 28 into motion, to clamp and move the battery up from the grooved conveyor belt 18 and then adjust the orientation of the battery's positive terminal in accordance with the instruction of the control mechanism 11. The operating platform 15 may include a first station, a second station, a third station, and a fourth station. From the first station to the fourth station, two adjacent stations are distributed at 90° angle. Each station has a V-groove structure. The multi-station operating table 32 is configured to perform different recycling procedures for the battery. The flexible grabber mechanism places the battery on the first working station of the multi-station operating table 32, and the flexible grabber mechanism is then reset to perform the next operation.

The flexible grabber mechanism transports the battery from the transmission mechanism 2 to the first station of the operating platform 50, and is configured to adjust the orientation of the battery's positive and negative terminals. The flexible grabber mechanism adopts the above structure. The flexible grabber mechanism clamps the battery from the transmission mechanism 2 and moves the battery to a desired position, then opens the grabber fingers 28 and places the battery in the V-shaped groove of the multi-station operating table 32. This structure is simple and easy to control, where a pair of semi-circular gripper fingers 28 are suitable for picking up round workpieces.

Figure 8:
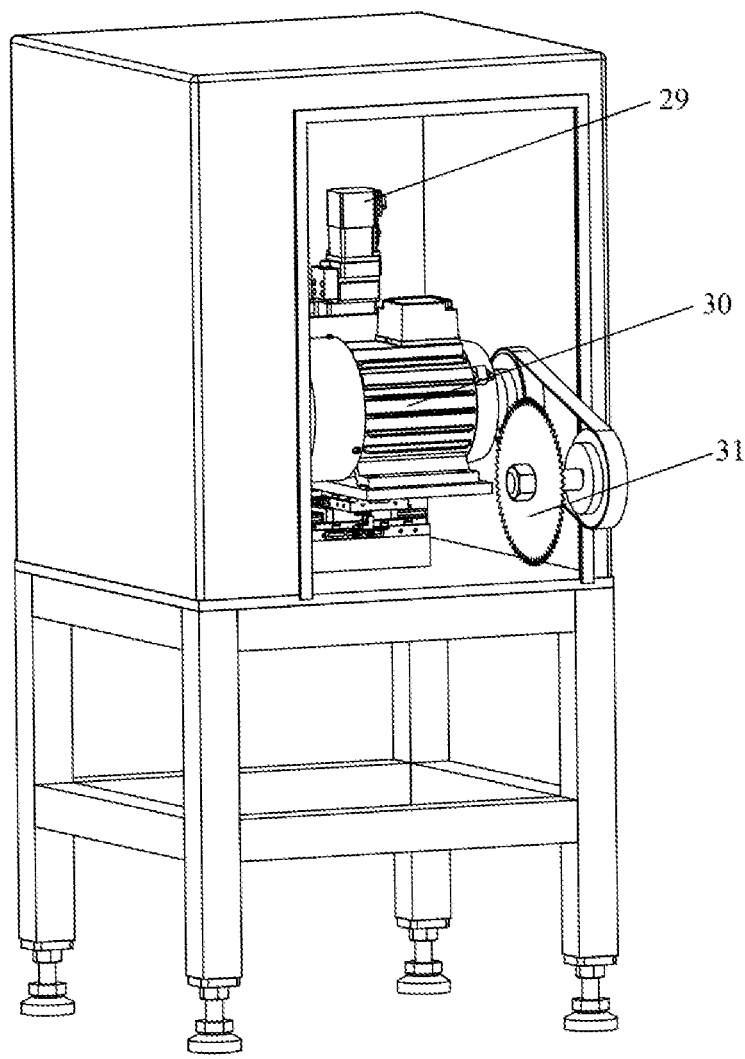
FIG. 8 is a schematic diagram illustrating an automatic cutting mechanism provided by an embodiment.
Figure 9:
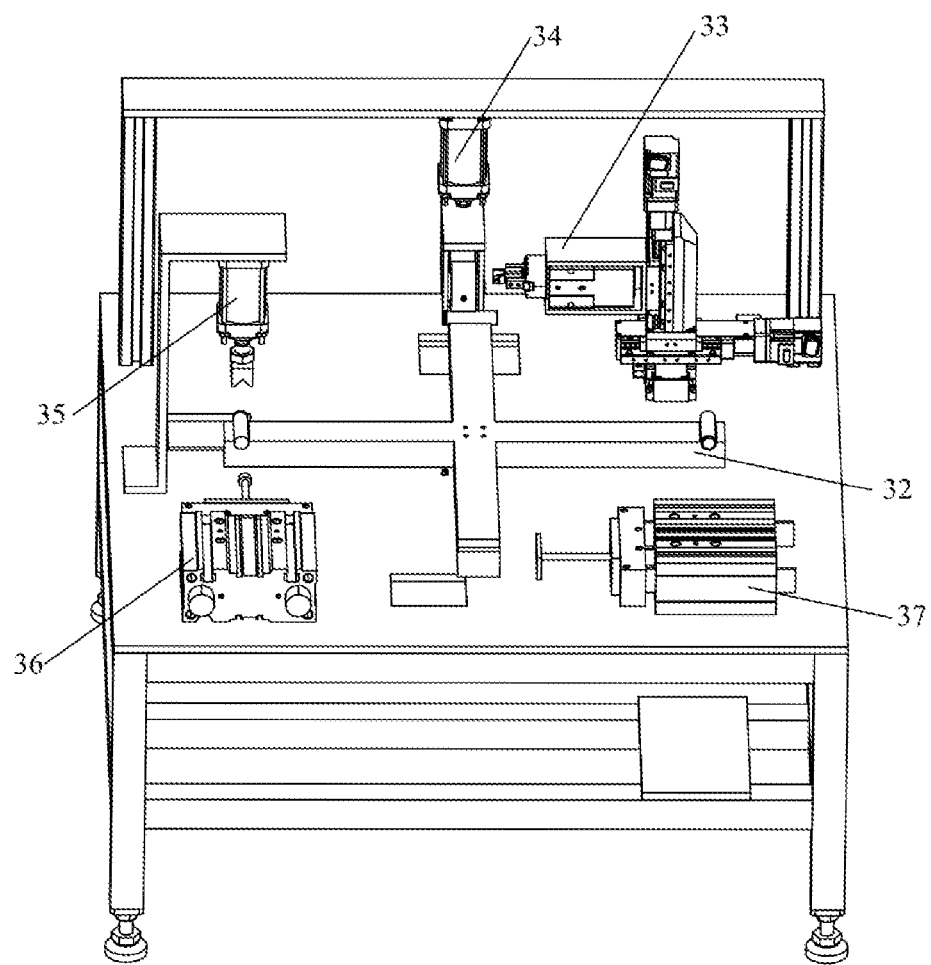
FIG. 9 is a schematic diagram illustrating an automatic separation mechanism provided by an embodiment.
Figure 10:
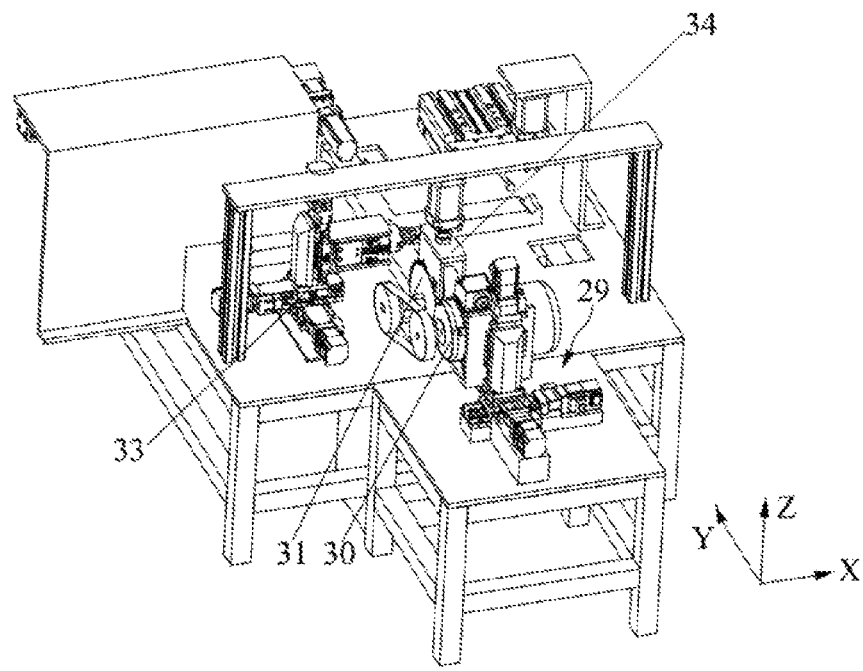
FIG. 10 is a schematic diagram illustrating an automatic separation mechanism provided by an embodiment viewed from another perspective.
Figure 11:
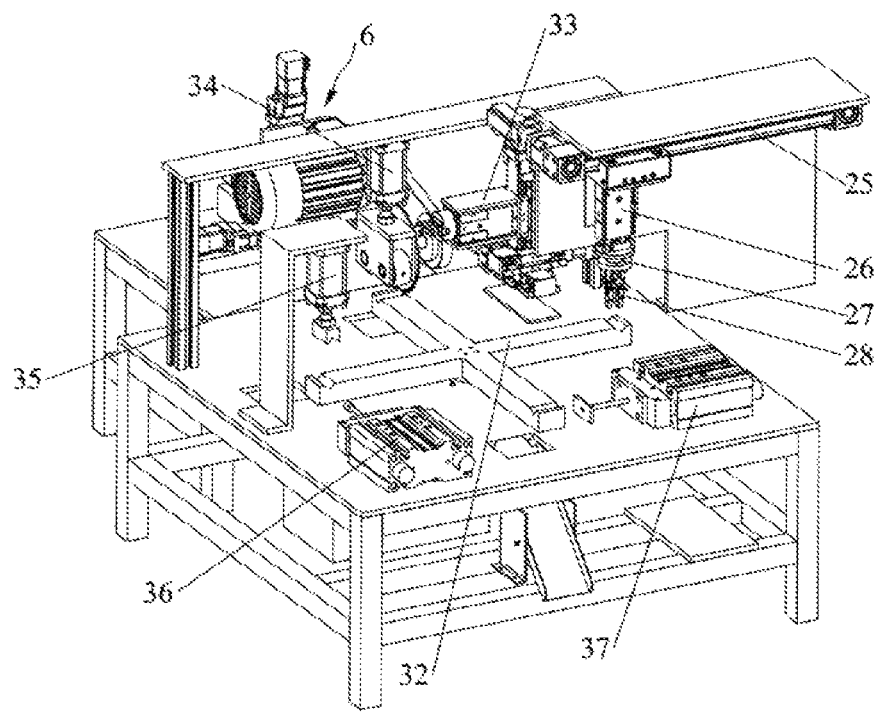
FIG. 11 is a schematic diagram illustrating an automatic separation mechanism provided by an embodiment viewed from yet another perspective.
Figure 12:
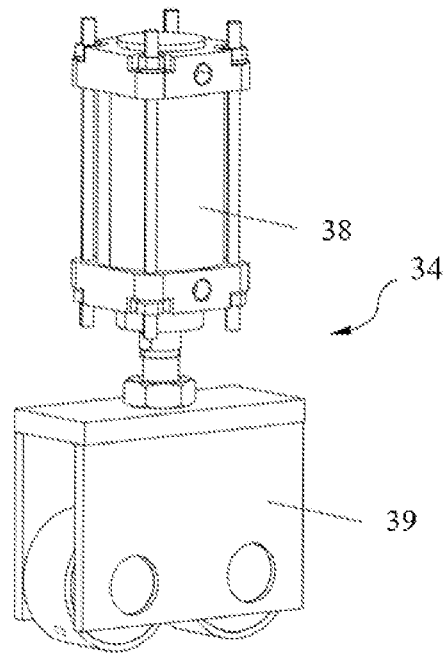
FIG. 12 is a schematic diagram illustrating a rotary mechanism provided by an embodiment.
Figure 13:
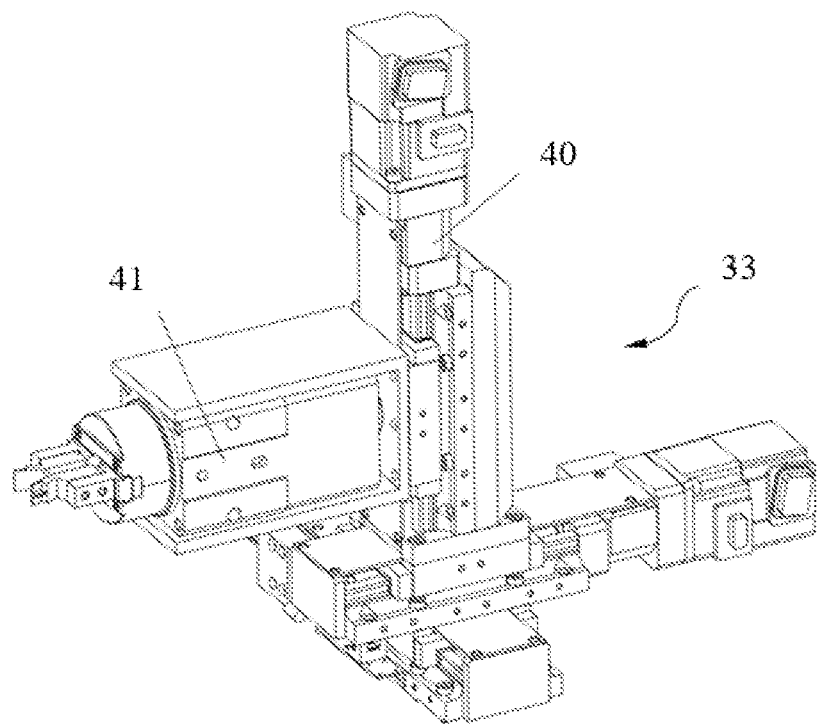
FIG. 13 is a schematic diagram illustrating a casing breaking mechanism provided by an embodiment.

FIG. 8 shows an automatic cutting mechanism 6 of the battery pre-processing apparatus. The automatic cutting mechanism 6 includes a linear cutting assembly 29, a cutting motor 30, and a cutting blade 31, where the linear cutting assembly 29 is operative to move in the X, Y, and Z directions. The automatic cutting mechanism 6 is externally connected to the control mechanism 11. The linear cutting assembly 29 adjusts a feeding amount of the cutting blade 31 in accordance with the instructions of the control mechanism to complete the battery cutting.

The automatic cutting mechanism 6 has three degrees of freedom to realize the feed of the automatic cutting mechanism 6 in three directions, thereby achieving the cutting of the battery by adjusting the cutting amount. The automatic cutting mechanism 6 adopts the above structure. The rotary mechanism 34 fixes and rotates the battery that is placed on the second station, and the automatic cutting mechanism 6 drives the cutting blade 31 to cut off the positive terminal and the negative terminal. Rotary cutting improves efficiency and reduces the shear stress acted on the battery casing by the saw blade, which is an ideal cutting method. High-speed cutting can also reduce the thermal effect in the cutting area as much as possible to avoid affecting the structure of the jelly roll.

After the flexible grabber mechanism puts the battery on the first station, the grabber rotation cylinder 27 rotates 90° to enter the second station. The grabber guide cylinder 26 drives the grabber rotation cylinder 27 to descend to the desired position, clamp and drive the battery on the second station into rotation. At this time, the automatic cutting mechanism 6 adjusts the feed of the cutting blade 31 to cut off the positive terminal, and the linear cutting assembly 29 drives the cutting knife 31 to move horizontally to the negative terminal cutting position, and after the cutting is completed, the cutting fragments fall into the scrap recycling box 52. The automatic cutting mechanism 6 is then reset for the next cutting.

Figure 14:
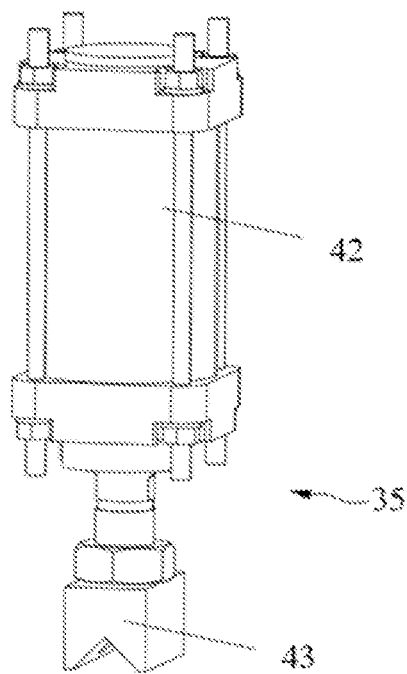
FIG. 14 is a schematic diagram illustrating a fixing mechanism provided by an embodiment.
Figure 15:
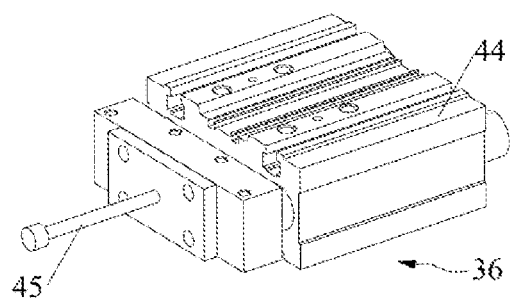
FIG. 15 is a schematic diagram illustrating a jelly roll push-out mechanism provided by an embodiment.
Figure 16:
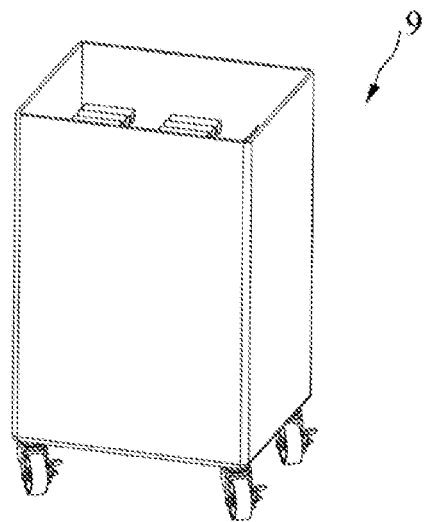
FIG. 16 is a schematic diagram illustrating a jelly roll recycling box provided by an embodiment.
Figure 17:
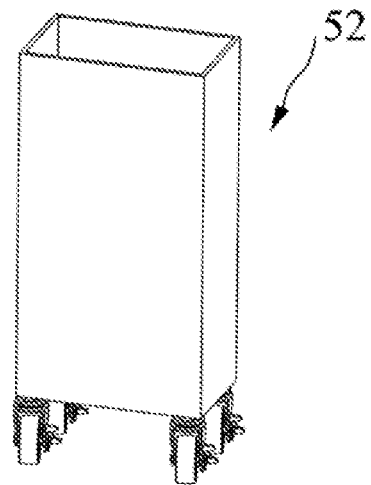
FIG. 17 is a schematic diagram illustrating a scrap recycling box provided by an embodiment.

As illustrated in FIGS. 8-15, the cylindrical lithium battery automatic separation mechanism 5 may further include: a rotary mechanism 34, a casing breaking mechanism 33, a fixing mechanism 35, a jelly roll push-out mechanism 36, and a casing push-out mechanism 37, which are arranged on the multi-station operating table 32. The automatic separation mechanism 5 is connected to the automatic cutting mechanism 6, and three recycling boxes are disposed under the automatic separation mechanism 5. The multi-station operating table 32 is rotatably arranged on the operating platform 50. The rotary mechanism 34 is disposed above the second station, and is configured to clamp and drive the battery into rotation. The casing breaking mechanism 33 is arranged adjacent to the second station, and is configured to burst open the battery casing to facilitate the pushing out of the jelly roll. The fixing mechanism 35 is arranged above the third station. The jelly roll push-out mechanism 36 is disposed adjacent to the third station. Referring to FIG. 14, the fixing mechanism 35 may move vertically above the battery to approach the battery, thereby clamping the battery. Referring to FIG. 15, the jelly roll push-out mechanism 36 moves in the horizontal direction to approach the battery, thereby completing separation of the jelly roll from the battery casing. The casing push-out mechanism 37 is arranged adjacent to the fourth station, and is configured to push the battery casing out for recycling.

The rotary mechanism 34 includes a rotation guide cylinder 38 and a rotary assembly 39. The rotation guide cylinder 38 drives the rotary assembly 39 to move to a desired position. The rotary assembly 39 includes two rollers, which are operative to rotate so as to clamp and drive the battery into rotation.

The casing breaking mechanism 33 includes a casing breaking linear assembly 40 and a casing breaking actuator 41. The casing breaking actuator 41 includes a rotary cylinder, an opening and closing cylinder, and a casing breaking finger, where the opening and closing cylinder is arranged on the rotary cylinder, and the casing breaking finger is arranged on the front end of the opening and closing cylinder.

One pair of casing breaking fingers is provided with a casing breaking blade on the inside and an arc-shaped finger on the outside. The casing breaking linear assembly 40 has three degrees of freedom.

The casing breaking linear assembly 40 drives the casing breaking actuator 41 to travel to a desired position. Then the cylinder is opened and closed, and the casing breaking blade of the casing breaking finger cuts open the battery casing. The opening and closing cylinder continues to open, so that the arc-shaped casing breaking fingers complete the breaking of the casing. Then the casing breaking actuator 41 rotates 90°, and the casing breaking is completed for one more time. In this way, the battery opening becomes large, which facilitates the pushing out of the jelly roll. In view of the fact that LiPF6 in the battery electrolyte easily reacts with moisture in the air to generate hydrofluoric acid, the casing breaking finger may be made of a hydrofluoric acid-resistant material.

The fixing mechanism 35 includes a fixing guide cylinder 42 and a V-groove fixing block 43. The fixing guide cylinder 42 drives the V-groove fixing block 43 to move to a specific position to fix the battery.

The jelly roll push-out mechanism 36 includes a power guide cylinder 44 and a jelly roll push rod 45. The power guide cylinder 44 drives the jelly roll push rod 45 to push out the jelly roll, where the jelly roll push rod 45 is also made of a hydrofluoric acid-resistant material, the push rod head is a cylindrical head, and the diameter of the push rod head is smaller than the inner diameter of the cylindrical lithium battery.

After the spent cylindrical lithium battery is cut at the second station, the roller of the rotary mechanism 34 stops rotating and the battery is clamped up, and the casing breaking mechanism 33 moves to a specific position to complete two casing breaking operations in mutually perpendicular directions, and then the rotary mechanism 34 is reset. The multi-station operating table 32 rotates 90° so that the battery enters the third station. The fixing mechanism 35 descends to fix the battery. The power guide cylinder 44 of the jelly roll push-out mechanism 36 pushes the jelly roll push rod 45 to complete the separation of the jelly roll and the battery casing. Then the jelly roll falls into the jelly roll recycling box 9 and the fixing mechanism 35 rises to the original position. Then the multi-station operating table 32 rotates 90° once again, and the remaining battery casing enters the fourth station. At this point, the casing push-out mechanism 37 pushes the casing into the material falling port and the battery casing enters the battery casing recycling box 8 via the falling material receiving slope.

After the cutting of the battery is completed, the rotary mechanism 34 fixes the battery, and the casing breaking fingers break up the casing and widen the opening of the battery, thereby facilitating the push-out of the jelly roll from the battery casing. Meanwhile, the jelly roll push-out mechanism 36 should avoid corrosion by electrolyte. After the jelly roll is recovered, the battery casing enters the next station and is pushed out and recycled by the casing push-out mechanism 37.

Referring to FIG. 1, FIG. 2, FIG. 16 and FIG. 17, the recovery and dust collection assembly further includes an exhaust gas treatment mechanism 10. The irregular-shaped battery recycling box 7 is disposed under the conveyor belt 4.

The scrap recycling box 52, the jelly roll recycling box 9, and the battery casing recycling box 8 are each connected to the automatic separation mechanism 5. The scrap recycling box 52 is arranged under the second station. The jelly roll recycling box 9 is arranged under the third station. The battery casing recycling box 8 is arranged under the fourth station. The scrap recycling box 52, the jelly roll recycling box 9, and the battery casing recycling box 8 realize material sorting and recycling. The exhaust gas treatment mechanism 10 is mainly used for removing residue particles and acid gases in the exhaust gas. The exhaust gas produced by volatilization during the cutting and separation process is discharged from the exhaust pipe, enters the exhaust gas treatment mechanism 10, and is then discharged into the atmosphere after being filtered by a filter screen, neutralized by an alkaline solution, and filtered by activated carbon.

The automatic separation mechanism 5 bursts open the battery casing that has been cut. At this time, the opening of the cylindrical battery becomes larger, and the jelly roll push-out mechanism 36 is used to push the jelly roll out for recycling, thereby completing the recycling of the casing.

The multi-station operating table 32 is provided with a rotary motor, a multi-station rotary table, and a V-shaped groove. The multi-station operating table 32 is operative to rotate in the plane at angles of 0°, 90°, 180°, and 270°. The flexible grabber mechanism places the battery transported by the transmission mechanism 2 on the first station and adjusts the battery's orientation. The multi-station operating table 32 rotates 90° to enter the second station for cutting, then rotates another 90° to the third station to separate the battery casing from the jelly roll, and then rotates yet another 90° to the fourth station to recover the battery casing. After that, the multi-station operating table 32 returns to the first station to repeat the above operations. The V-groove is configured to fix the cylindrical battery.

The multi-station operating table 32 improves the efficiency of the production line, and the working process is reliable and stable.

The working principle of the battery pre-processing apparatus provided in this embodiment is as follows. During operation, the spent cylindrical lithium batteries are manually placed, the automatic feeding mechanism 1 grabs the batteries in batches, and places them intermittently and orderly on the transmission mechanism 2. Under the action of gravity, the transmission mechanism 2 transports the cylindrical lithium batteries in a smooth and uniform manner. During the transmission interval, the electricity monitoring actuator 3 perform discharging of the battery, and the non-destructive testing mechanism obtains the orientation of the battery's positive and negative terminals, shape parameters, and amount of deformation of the battery. According to the previously stored cylindrical lithium battery data, if the battery has a large deformation, the flexible grabber mechanism transports the battery to the conveyor belt 4 so that the battery goes to the irregular-shaped battery recycling box 7. If the deformation amount of the battery meets the requirements, then the flexible grabber mechanism may transport the battery to the first station of the multi-station operating table 32, where if the orientation is inconsistent, then the battery's orientation would be adjusted. The multi-station operating table 32 then rotates to the second station. At this time, the rotary mechanism 34 descends, and clamps up and drives the battery into rotation. The automatic cutting mechanism 6 adjusts the feeding parameters of the cutting blade 31 in accordance with the instructions of the control mechanism 11 to cut off the battery's positive and negative terminals. The rotary mechanism 34 then stops rotating, and the casing breaking mechanism 33 completes the vertical sectional cutting of the battery casing at the second station. The rotary mechanism 34 then rises and resets, and the multi-station operating table 32 rotates 90°. At this time, the battery is on the third station. The fixing mechanism 35 then descends to fix the up battery. The jelly roll push-out mechanism 36 pushes out the jelly roll from the casing to the jelly roll recycling box 9 to realize recycling of the jelly roll. Then the fixing mechanism 35 and the jelly roll push-out mechanism 36 are reset. The multi-station operating table 32 then rotates another 90°, and the remaining battery casing enters the fourth station, where the battery is pushed out by the casing push-out mechanism 37 and falls into the battery casing recycling box 8. In this disassembly process, the joint between the automatic cutting mechanism 6 and the automatic separation mechanism 5 is sealed with a fluororubber pad, and an exhaust pipe is provided on the top to extract the exhaust gas, which is extracted and discharged into the atmosphere after receiving greening treatment by the exhaust gas treatment mechanism 10.

The pre-processing apparatus as a whole is equipped with all functions from feeding to recycling, with a high degree of automation, simple structure, ease of operation, and flexible design, which can be used for recycling of various spent cylindrical lithium batteries. It is suitable for mass production, avoids manual pre-processing, improves the efficiency of disassembly, and effectively avoids the security risks of manual disassembly.

The automatic feeding mechanism 1 and the transmission mechanism 2 of this embodiment can realize accurate batch feeding, orderly and unified transportation of the batteries, which is stable and reliable, and can avoid short circuits when the batteries are in a disorderly state.

The rotary mechanism 34 of this embodiment drives the battery to rotate for cutting purposes, which improves the efficiency and reduces the shear stress acted on the battery casing by the saw blade.

The electricity monitoring actuator 3 of this embodiment is coupled with an external battery detection device, which can realize the release of the residual electricity of the spent cylindrical lithium battery, avoiding explosion during disassembly, and is therefore safe and reliable. This embodiment adopts a non-destructive testing mechanism, which can accomplish the accurate identification of battery's positive and negative terminals, shape parameter detection, and deformation detection, which not only facilitates the battery cutting and positioning, but also prevents a severely deformed battery from affecting subsequent procedures. The flexible grabber mechanism of this embodiment can accomplish the accurate transportation of the battery from the transmission mechanism 2 to the multi-station operating table 32, and the flexible grabber mechanism can grab cylindrical lithium batteries of different specifications, with a flexible design. The multi-station operating table 32 improves equipment coordination, simplifies the structure, and improves processing efficiency. The casing breaking mechanism 33 breaks up the battery casing and widens the battery opening, which facilitates pushing the jelly roll out of the battery casing. The jelly roll push-out mechanism 36 has a simple structure and low cost, making it extremely easy to accomplish separation of the jelly roll. In addition, the automatic cutting mechanism of this embodiment has a sealed design at 6 locations, with a scrap recycling box 52 at the bottom and an exhaust port at the top that is connected to an external exhaust gas treatment mechanism 10, thereby greatly reducing the impact of exhaust gases and residues on the environment.

The recovery and dust collection assembly can realize the functions of deformed battery recover, cutting fragments recovery, jelly roll recovery, casing recovery, exhaust gas extraction and processing, and so on. The recovery and dust collection assembly adopts the above structure, and automatically recycles different used materials separately to avoid manual sorting. Exhaust gas is discharged into the atmosphere after receiving greening treatment.

Figure 19:
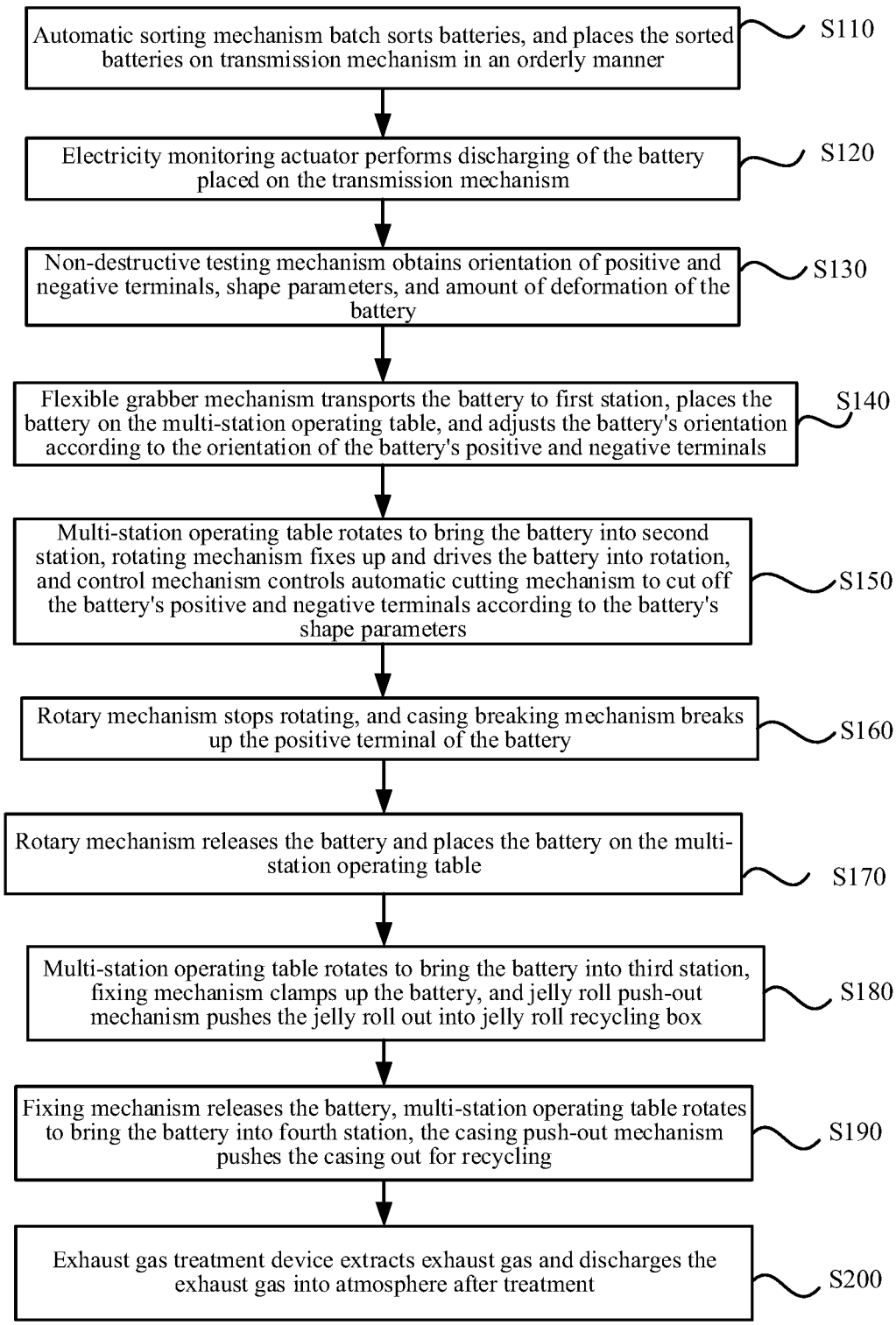
FIG. 19 is a flowchart illustrating a battery pre-processing method provided by an embodiment.

There is also provided a battery pre-processing method which uses the above-described battery pre-processing apparatus. Referring to FIG. 19, the battery pre-processing method includes the following operations.

In S110, the automatic feeding mechanism 1 places the grabbed batteries in an orderly manner on the battery transmission mechanism 2.

In S120, the electricity monitoring actuator 3 performs the discharge of the battery on the transmission mechanism 2.

In S130, the non-destructive testing mechanism obtains the orientation of the positive and negative terminals, shape parameters, and amount of deformation of the battery.

In S140, the flexible grabber mechanism transports the battery to the first station, places the battery on the multi-station operating table 32, and adjusts the battery's orientation based on the orientation of the battery's positive and negative terminals.

In S150, the multi-station operating table 32 rotates so that the battery enters the second station, the rotary mechanism 34 fixes up and drives the battery into rotation, and the control mechanism 11 controls the automatic cutting mechanism 6 to cut off the battery's positive and negative terminals according to the battery's shape parameters.

In S160, the rotary mechanism 34 stops rotating, and the casing breaking mechanism 33 breaks up the positive terminal of the battery.

In S170, the rotary mechanism 34 resets and releases the battery.

In S180, the multi-station operating table 32 rotates so that the battery enters the third station, the fixing mechanism 35 clamps up the battery, and the jelly roll push-out mechanism 36 pushes the jelly roll into the recycling box 9.

In S190, the fixing mechanism 35 is controlled to release the battery, the multi-station operating table 32 rotates so that the battery enters the fourth station, and the casing push-out mechanism 37 pushes the casing out for recycling.

In S200, the exhaust gas treatment mechanism 10 extracts the exhaust gas, and discharges the exhaust gas into the atmosphere after greening treatment.

What is claimed is:

1. A battery pre-processing apparatus, comprising:
   a control mechanism;
   an automatic cutting mechanism, coupled to the control mechanism and configured for cutting off a positive terminal and a negative terminal of a battery;
   an automatic feeding mechanism, coupled to the control mechanism;
   a transmission mechanism, coupled to the control mechanism, wherein the automatic feeding mechanism is configured for placing the battery on the transmission mechanism;
   an electricity monitoring actuator, arranged above the transmission mechanism and coupled to the control mechanism;
   a conveyor belt, arranged at an end of the transmission mechanism and connected to a side of the transmission mechanism;
   a non-destructive testing mechanism, arranged above the transmission mechanism and coupled to the control mechanism;
   a flexible grabber mechanism, coupled to the control mechanism;
   an automatic separation mechanism, coupled to the control mechanism, wherein a discharge port is provided above the automatic separation mechanism and the automatic separation mechanism comprises a multi-station operating table, wherein the flexible grabber mechanism is configured for grabbing and moving the battery on the transmission mechanism onto the multi-station operating table; and
   a recovery and dust collection assembly, configured for recycling a deformed battery, cutting fragments, a jelly roll, and a battery casing, and for extraction and treatment of an exhaust gas;
   wherein the automatic feeding mechanism, the transmission mechanism, the flexible grabber mechanism, the automatic cutting mechanism, the automatic separation mechanism, and the recovery and dust collection assembly are sequentially arranged.

2. The battery pre-processing apparatus as recited in claim 1, wherein the recovery and dust collection assembly comprises an irregular-shaped battery recycling box, a scrap recycling box, a jelly roll recycling box, a casing recycling box, and an exhaust gas treatment mechanism, wherein the irregular-shaped battery recycling box is connected to the conveyor belt, and wherein the scrap recycling box, the jelly roll recycling box, and the casing recycling box are each connected to the automatic separation mechanism, wherein the exhaust gas treatment mechanism is connected to the discharge port and is coupled to the control mechanism.

3. The battery pre-processing apparatus as recited in claim 2, further comprising an operating platform, wherein the automatic feeding mechanism comprises a loading bracket, a loading linear assembly, a loading linear slide assembly, and a loading mechanical arm, wherein the loading bracket is fixed to the operating platform, the loading linear assembly is arranged on the top of the loading bracket, the loading linear slide assembly is vertically connected to the loading linear assembly, and the loading mechanical arm is arranged under the loading linear slide assembly.

4. The battery pre-processing apparatus as recited in claim 3, wherein the loading mechanical arm comprises a plurality of suction cups each having an arc-shaped groove, and a plurality of holes are provided in the arc-shaped groove, wherein an axis of each of the plurality of holes is perpendicular to an axis of the groove, and the plurality of suction cups comprise a guard plate that is mounted on a periphery of the plurality of suction cups.

5. The battery pre-processing apparatus as recited in claim 2, wherein the transmission mechanism comprises a sloped falling material receiving belt, a baffle, an L-shaped conveyor belt, and a triangular steel frame, wherein the sloped falling material receiving belt is at a first preset angle with the horizontal plane and is fixed to the triangular steel frame, wherein the L-shaped conveyor belt is inclinedly connected to the sloped falling material receiving belt and comprises an inclined end and a horizontal end connected to the inclined end, wherein the inclined end and the horizontal plane form a second preset angle, wherein the second preset angle is smaller than the first preset angle, and the baffle is disposed on both sides of the L-shaped conveyor belt.

6. The battery pre-processing apparatus as recited in claim 3, wherein the electricity monitoring actuator comprises a support frame, an actuator guide cylinder a parallel gripper, and a discharge finger, wherein the support frame is arranged on the operating platform, the actuator guide cylinder is fixed to the support frame, a bottom of the actuator guide cylinder is connected to the parallel gripper, the discharge finger is arranged under the parallel gripper and is coupled to an external battery detection device.

7. The battery pre-processing apparatus as recited in claim 2, wherein the flexible grabber mechanism comprises a grabber linear assembly, a grabber guide cylinder, a grabber rotation cylinder, and a grabber finger, wherein the grabber linear assembly is mounted onto a support plate, wherein the grabber guide cylinder, the grabber rotation, and the grabber finger are sequentially arranged under the grabber linear assembly, wherein the gripper finger is provided in the number of a pair which each have an arc-shaped groove.

8. The battery pre-processing apparatus as recited in claim 3, wherein the automatic separation mechanism comprises: a casing breaking mechanism, a rotary mechanism, a fixing mechanism, a jelly roll push-out mechanism, and a casing push-out mechanism, wherein the multi-station operating table is arranged on the operating platform, the operating platform comprising a first station, a second station, a third station, and a fourth station, wherein the second station, the third station, and the fourth station each comprise a V-shaped groove, and a material falling port is provided at a lower portion of each of the second station, the third station, and the fourth station, wherein the casing breaking mechanism is arranged on the second station and adjacent to the positive terminal of the battery, the rotary mechanism is arranged above the second station and comprises a pair of rollers, which are arranged under the rotary mechanism, wherein the fixing mechanism is arranged above the third station, the jelly roll push-out mechanism is arranged on the third station, and the casing push-out mechanism is arranged on the fourth station, wherein the jelly roll push-out mechanism and the casing push-out mechanism are disposed adjacent to the negative terminal of the battery.

9. The battery pre-processing apparatus as recited in claim 8, wherein the casing breaking mechanism comprises a casing breaking linear assembly and a casing breaking actuator, wherein the casing breaking actuator comprises a pair of casing breaking fingers which are arranged at an end of the casing breaking actuator, the casing breaking fingers comprising a casing breaking blade.

10. The battery pre-processing apparatus as recited in claim 8, wherein the jelly roll push-out mechanism comprises a power guide cylinder and a jelly roll push rod, wherein the jelly roll push rod is cylindrical and has a diameter that is smaller than an inner diameter of the battery, and is made of a hydrofluoric acid-resistant material.

11. A battery pre-processing method, using a battery pre-processing apparatus, the battery pre-processing apparatus comprising: a control mechanism: an automatic cutting mechanism coupled to the control mechanism and configured for cutting off a positive terminal and a negative terminal of a battery: an automatic feeding mechanism coupled to the control mechanism: a transmission mechanism coupled to the control mechanism, wherein the automatic feeding mechanism is configured for placing the battery on the transmission mechanism: an electricity monitoring actuator arranged above the transmission mechanism and coupled to the control mechanism: a conveyor belt arranged at an end of the transmission mechanism and connected to a side of the transmission mechanism: a non-destructive testing mechanism arranged above the transmission mechanism and coupled to the control mechanism: a flexible grabber mechanism coupled to the control mechanism: an automatic separation mechanism coupled to the control mechanism, wherein a discharge port is provided above the automatic separation mechanism and the automatic separation mechanism comprises a multi-station operating table, wherein the flexible grabber mechanism is configured for grabbing and moving the battery on the transmission mechanism onto the multi-station operating table: and a recovery and dust collection assembly configured for recycling a deformed battery, cutting fragments, a jelly roll, and a battery casing, and for extraction and treatment of an exhaust gas: wherein the automatic feeding mechanism, the transmission mechanism, the flexible grabber mechanism, the automatic cutting mechanism, the automatic separation mechanism, and the recovery and dust collection assembly are sequentially arranged, the battery pre-processing method comprising:
placing, by the automatic feeding mechanism, grabbed batteries in an orderly manner on the battery transmission mechanism;
discharging, by the electricity monitoring actuator, the battery placed on the transmission mechanism;
obtaining, by the non-destructive testing mechanism, an orientation of positive and negative terminals, shape parameters, and an amount of deformation of the battery;
transporting, by the flexible grabber mechanism, the battery to the first station, placing the battery on the multi-station operating table, and adjusting the battery's orientation based on the orientation of the battery's positive and negative terminals;
rotating by the multi-station operating table to bring the battery into the second station, fixing and driving by the rotary mechanism of the automatic separation mechanism the battery into rotation, and controlling, by the control mechanism, the automatic cutting mechanism to cut off the battery's positive and negative terminals according to the battery's shape parameters;
stopping rotating by the rotary mechanism, and breaking open the positive terminal of the battery by the casing breaking mechanism of the automatic separation mechanism;
resetting by the rotary mechanism and releasing the battery;
rotating, by the multi-station operating table, to bring the battery into the third station, clamping up the battery by the fixing mechanism, and pushing out the jelly roll into the jelly roll recycling box by the jelly roll push-out mechanism of the automatic separation mechanism;
releasing the battery by the fixing mechanism, rotating by the multi-station operating table to bring the battery into the fourth station, and pushing the casing out by the casing push-out mechanism of the automatic separation mechanism for recycling; and
extracting, by the exhaust gas treatment mechanism the exhaust gas, and discharging the exhaust gas into the atmosphere after greening treatment.

12. The battery pre-processing method as recited in claim 11, wherein the recovery and dust collection assembly comprises an irregular-shaped battery recycling box, a scrap recycling box, a jelly roll recycling box, a casing recycling box, and an exhaust gas treatment mechanism, wherein the irregular-shaped battery recycling box is connected to the conveyor belt, and wherein the scrap recycling box, the jelly roll recycling box, and the casing recycling box are each connected to the automatic separation mechanism, wherein the exhaust gas treatment mechanism is connected to the discharge port and is coupled to the control mechanism.

13. The battery pre-processing method as recited in claim 12, wherein the battery pre-processing apparatus further comprises an operating platform, wherein the automatic feeding mechanism comprises a loading bracket, a loading linear assembly, a loading linear slide assembly, and a loading mechanical arm, wherein the loading bracket is fixed to the operating platform, the loading linear assembly is arranged on the top of the loading bracket, the loading linear slide assembly is vertically connected to the loading linear assembly, and the loading mechanical arm is arranged under the loading linear slide assembly.

14. The battery pre-processing method as recited in claim 13, wherein the loading mechanical arm comprises a plurality of suction cups each having an arc-shaped groove, and a plurality of holes are provided in the arc-shaped groove, wherein an axis of each of the plurality of holes is perpendicular to an axis of the groove, and the plurality of suction cups comprise a guard plate that is mounted on a periphery of the plurality of suction cups.

15. The battery pre-processing method as recited in claim 12, wherein the transmission mechanism comprises a sloped falling material receiving belt, a baffle, an L-shaped conveyor belt, and a triangular steel frame, wherein the sloped falling material receiving belt is at a first preset angle with the horizontal plane and is fixed to the triangular steel frame, wherein the L-shaped conveyor belt is inclinedly connected to the sloped falling material receiving belt and comprises an inclined end and a horizontal end connected to the inclined end, wherein the inclined end and the horizontal plane form a second preset angle, wherein the second preset angle is smaller than the first preset angle, and the baffle is disposed on both sides of the L-shaped conveyor belt.

16. The battery pre-processing method as recited in claim 13, wherein the electricity monitoring actuator comprises a support frame, an actuator guide cylinder, a parallel gripper, and a discharge finger, wherein the support frame is arranged on the operating platform, the actuator guide cylinder is fixed to the support frame, a bottom of the actuator guide cylinder is connected to the parallel gripper, the discharge finger is arranged under the parallel gripper and is coupled to an external battery detection device.

17. The battery pre-processing method as recited in claim 12, wherein the flexible grabber mechanism comprises a grabber linear assembly, a grabber guide cylinder, a grabber rotation cylinder, and a grabber finger, wherein the grabber linear assembly is mounted onto a support plate, wherein the grabber guide cylinder, the grabber rotation cylinder, and the grabber finger are sequentially arranged under the grabber linear assembly, wherein the gripper finger is provided in the number of a pair which each have an arc-shaped groove.

18. The battery pre-processing method as recited in claim 13, wherein the automatic separation mechanism comprises: a casing breaking mechanism, a rotary mechanism, a fixing mechanism, a jelly roll push-out mechanism, and a casing push-out mechanism, wherein the multi-station operating table is arranged on the operating platform, the operating platform comprising a first station, a second station, a third station, and a fourth station, wherein the second station, the third station, and the fourth station each comprise a V-shaped groove, and a material falling port is provided at a lower portion of each of the second station, the third station, and the fourth station, wherein the casing breaking mechanism is arranged on the second station and adjacent to the positive terminal of the battery, the rotary mechanism is arranged above the second station and comprises a pair of rollers, which are arranged under the rotary mechanism, wherein the fixing mechanism is arranged above the third station, the jelly roll push-out mechanism is arranged on the third station, and the casing push-out mechanism is arranged on the fourth station, wherein the jelly roll push-out mechanism and the casing push-out mechanism are disposed adjacent to the negative terminal of the battery.

19. The battery pre-processing method as recited in claim 18, wherein the casing breaking mechanism comprises a casing breaking linear assembly and a casing breaking actuator, wherein the casing breaking actuator comprises a pair of casing breaking fingers which are arranged at an end of the casing breaking actuator, the casing breaking fingers comprising a casing breaking blade.

20. The battery pre-processing method as recited in claim 18, wherein the jelly roll push-out mechanism comprises a power guide cylinder and a jelly roll push rod, wherein the jelly roll push rod is cylindrical and has a diameter that is smaller than an inner diameter of the battery, and is made of a hydrofluoric acid-resistant material.

* * * * *